United States Patent Office 3,243,242
Patented Mar. 29, 1966

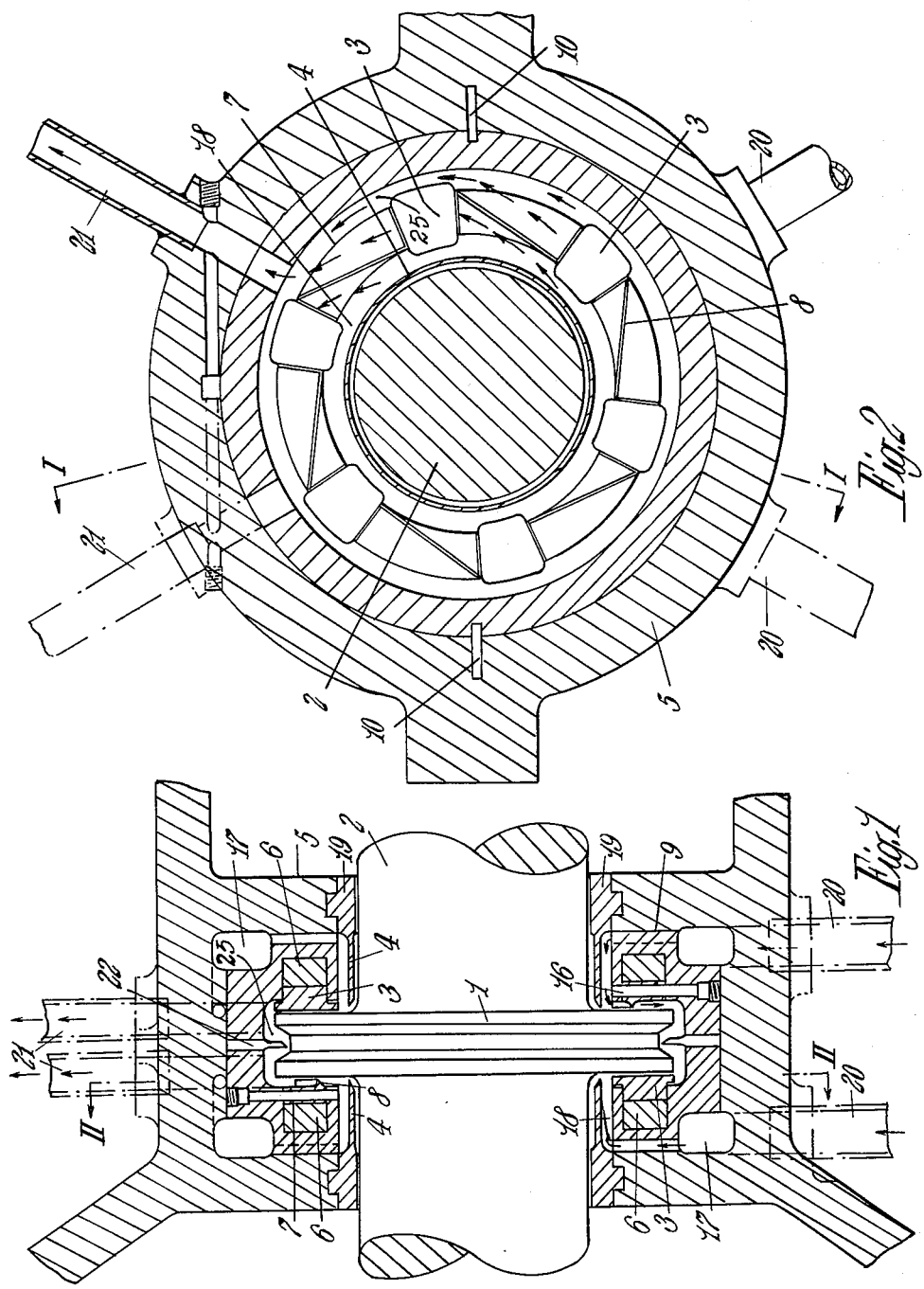

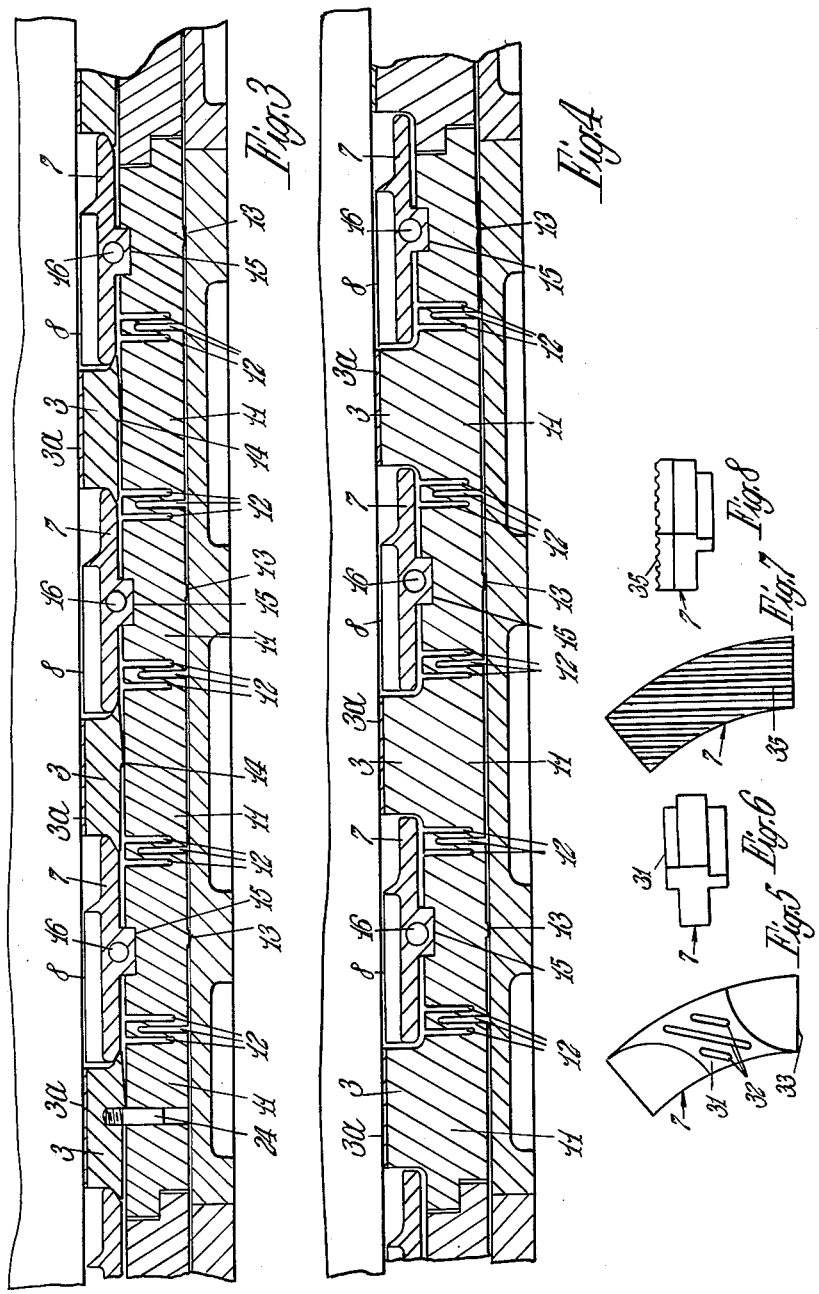

3,243,242
THRUST BEARINGS
Martin A. Hennessey, Wallsend, England, assignor to Pametrada, Wallsend, England, a British body corporate
Filed Nov. 26, 1963, Ser. No. 326,138
Claims priority, application Great Britain, Feb. 6, 1963, 4,876/63, 4,877/63, 4,878/63
18 Claims. (Cl. 308—160)

This invention relates to thrust bearings of the tilting thrust pad type.

The successful performance of thrust bearings of this type depends on the maintaining of a lubricant film of adequate thickness and correct wedge shape between the thrust pads and a shaft thrust collar.

The present invention is applicable to thrust bearings for taking thrust in one direction only or in both directions and is applicable to a bearing in which the shaft embodies an integral thrust collar or a thrust collar fastened to it by some suitable means.

It is known from tests, that small differences in the heights of individual thrust pads or misalignment between the thrust pads and the thrust collar can create large differences in the individual thrust pad loadings which may lead to damage to the pad, and which in any case considerably reduce the lubricant film thickness on the highly loaded pads.

Various proposals have been put forward for reducing the inequalities of loading between individual thrust pads and it is an object of the invention to achieve this end without a proliferation of parts leading to complication of the assembly and dismantling operations.

Accordingly the invention consists in a thrust bearing of the type indicated, in which an equalising ring is interposed between a set of thrust pads and the bearing housing, individual segments of said ring co-operating with individual thrust pads being mutually flexible and pivotally supported so as to eliminate excessive inequality of loading of individual thrust pads.

The equalising ring may be in one piece or may be divided into two or more parts.

The thrust pads may be integral with the equalising ring segments supporting them or they may be separately supported thereon.

Between each pair of segments of the ring or ring parts flexibility may be imparted by providing axially deep slots extending to a substantial extent in radial directions and these slots may be skewed to obtain a measure of control of cross tilt. Thus preventing dislining or scalloping of the thrust pad surface ensemble. It is especially useful to make the direction of the slots parallel to the direction of the pivot edge associated with the segment bounded by the slots.

Lubrication film thickness between thrust pads and shaft thrust collar can become reduce in consequence of carry-over of hot lubricant from pad to pad, which hot lubricant after mixing with cool inlet lubricant reduces the viscosity of the lubricant at the inlet edges of each pad and a further object of the present invention is to inhibit such carry-over.

Accordingly the invention also consists in providing suitably shaped diagonal deflectors or weirs on spacing pads disposed between the thrust pads to separate the cool inlet lubricant to each thrust pad from the hot lubricant discharged from the previous pad.

In thrust bearings of this type turbulence and subatmospheric pressure is liable to occur at the inner radius of the thrust collar, leading to the formation of gas bubbles in the bearing lubricant films.

Accordingly the bearing of the above type may include a fixed sleeve coaxial with the shaft and so positioned in relation to the set of thrust pads as to define a comparatively large fixed cavity from which lubricant may be supplied to the thrust pads without being whisked around by contact with the shaft.

The invention will be further described with reference to the accompanying drawings, in which:

FIGURE 1 is a longitudinal cross-section of one form of thrust bearing in accordance with the present invention, on the line I—I of FIGURE 2, FIGURE 2 is a cross-section on the line II—II of FIGURE 1, FIGURE 3 is an enlarged developed view of the thrust pads and pad spacers of FIGURES 1 and 2, FIGURE 4 is similar to FIGURE 3 but shows a modified form of the invention, FIGURES 5 and 6 are plan and end elevations showing a modified form of spacer pad, and FIGURES 7 and 8 are similar views of a second modified form of spacer pad.

In carrying the invention into effect according to the form illustrated by way of example in FIGURES 1 to 3 of the drawings, in which a collar 1 rigid on shaft 2 is adapted to take shaft thrust in either direction, a cage 9 is provided in a bearing housing 5.

In a recess in each end of the cage an equalising ring 6 is disposed and the cage is prevented from rotating by two keys 10 recessed into the face of the horizontal joint.

Each equalising ring consists of two half rings divided into a number of segments 11 by an arrangement of slots 12, these slots being dimensioned and positioned so as to constitute elastic hinges between the segments (FIGURE 3). Where the two half rings abut each other, the stepped end portions shown are provided with a slight barrelling or camber about the axis of the pivot ridge 13 on the adjacent pivoted segment to provide a rolling engagement.

The slots 12 though shown as substantially radial, may advantageously be skewed so as to obtain a measure of control of cross tilt, thus preventing dislining or scalloping of the thrust pad ensemble. In particular it may be especially useful to make the direction of the slots 12 parallel to the pivot edge of pivot ridge 13 associated with the particular segment 11 bounded by the slots 12.

Every alternate segment 11 is associated with a thrust pad 3 which is faced with a layer of antifriction metal 3a and the segments that lie between the segments carrying thrust pads have small substantially radially directed ridges 13 formed on their back face. These ridges 13 act as pivots, about which the segments 11 can tilt and the heights of the ridges 13 limit the amount of movement that can take place, the height being chosen so that the stresses in the elastic hinges do not exceed a safe value.

The proportions of the equalising rings are chosen that when subjected to equal loading from the thrust pads they are quite stiff in an axial direction. If an inequality of loading exists between individual thrust pads, due to errors in pad thickness or to misalignment or lack of truth of the thrust collar or to variations in lubricant viscosity separately or in combination, then the segments of the rings acting like the beam of an equal arm balance will tilt about the pivots formed by the ridges 13 and cause the elastic hinges to flex; this combination of tilting and flexing tends to produce an equal distribution of load between the thrust pads.

The height of the ridges 13 is limited so that the amount of rocking movement permitted does not exceed the maximum allowed before the hinge elements, i.e. the parts between slots 12, become overstressed.

The thrust pads 3 are located in a radial direction by the walls of the grooves formed in the cage, the circumferential pitching of the pads being determined by spacer pads 7.

To enable a load carrying film of lubricant to be generated between the thrust pads 3 and the thrust collar 1, the thrust pads are free to pivot about a shoulder 14 on the back of the pads 3, the position of this shoulder being determined from the theory of hydrodynamic lubrication for tilting-pad thrust bearings.

The thrust pad adjacent to the horizontal joint is located by spacer pads on one side only and in order to facilitate assembly of this pad it is equipped with a dowel pin 24 which loosely engages a hole in the associated equalising ring segment 11.

The spacer pads 7, perform a number of functions: they determine the position of the thrust pads relative to the elastic hinges between sections of the equalising rings, by means of the radial keys 15 on the back faces of the spacer pads which mate (loosely) with key ways formed in the front faces of the equalising rings 6, they transmit the frictional torque from the thrust pads via the radial dowels 16, to the cage 9, and also by means of diagonal weirs 8 formed on their front faces they direct cool inlet oil into the thrust pads and prevent hot oil discharged from the previous thrust pad mixing with the cool inlet lubricant. The weirs are set diagonally across the whole face of the spacer pads so as to separate the cool lubricant issuing from the inner annulus from the warmed up lubricant which is spilled after passage through the gaps between pads and thrust collar into the outer annulus.

The weirs 8 may be formed by single ridges, as shown, or alternatively, in order to obtain better sealing they may be multiple ridges, or they may be wide faced ridges with lengthwise grooves along the crest face.

The lubricant enters the bearing housing through suitably dimensioned inlet pipes 20 and is collected in the annular chambers 17. From here the lubricant flows through channels cut in the back of the cage to inner annular spaces 18 formed between the bore of the cage 9 and the sleeves 4 formed integrally with the shaft-end-seals 19. The function of these sleeves is to prevent the bulk of the lubricant from being whisked around by the surface of the shaft. The lubricant from here is directed into the thrust pads by the diagonal weirs 8 on the spacer pads 7. On leaving the thrust pads these weirs direct the lubricant into the annular space 25 formed between the cage and the outer periphery of the thrust collar. From here the lubricant is discharged from the bearing housing by suitably dimensioned outlet pipes 21. The annular chamber 25 at the periphery of the thrust collar is divided into two by a circumferential baffle 22. The function of this baffle is to separate the ahead and astern lubricant systems to prevent cross-circulation of the oil between them.

It is to be noted that bleed paths are provided from the upper parts or crowns of the annular chamber 17 to the corresponding outlet pipes 21. The function of these paths is to enable gas bubbles released from the lubricant in the pump and at pipe bends and constrictions to by-pass the pad region. This avoids the risks of cavitation and of low bearing strength bubbles forming part of the load bearing oil film.

Although some deviation either way in the spacing and angular widths of the thrust pads is permissible, it is desirable that the angular spaces between thrust pads be made not less than the angular widths of individual pads and not greater than twice the angular width of individual thrust pads.

Instead of pivoting the rocking segments of the ring on ridges 13 formed on the segments it is possible to provide ribs on the cage 9 for this purpose. Such a rib, if of semi-circular cross section, could be made to co-operate with grooves in the faces of the rocking segments adjacent the cage.

FIGURE 4 shows a modification of the arrangement, in which the thrust pads 3 are formed as integral extensions of the alternate segments 11 of the equalising ring 6.

FIGURES 5 to 8 show two alternative forms for the weirs formed in the spacer pads 7. FIGURE 5 shows the face of the spacer pad 7 carrying a wide plateau-like raised portion 31 with three grooves 32 across the radial oil flow component and FIGURE 6 is a view towards the radial end face 33.

A further advantage, i.e. apart from the greater efficiency as a weir of the raised portion 31, is the fact that a volume otherwise available for eddies to develop in is now occupied by metal and thus denied to the lubricant.

The arrangement of FIGURES 7 and 8 may be even more efficient from this particular aspect. Here the spacer pad 7 is faced with anti-friction metal and a number of channels 35 are formed in the face which either lead from the exit edge of one thrust pad to the oil drain way 25 or from the oil supply way 18 to the oil entry edge of the following thrust pad.

Various other modifications may be made within the scope of the appended claims.

I claim:

1. A thrust bearing for supporting a shaft having a thrust collar rigidly mounted thereon, comprising a bearing housing, a set of thrust pads, a set of spacer pads mounted one between each pair of thrust pads, and an equalising ring interposed between the thrust and spacer pads and the bearing housing, the equalising ring being divided into segments, every second segment supporting a thrust pad and the intervening segments each supporting a spacer pad, the segments being flexibly joined to adjacent segments, pivot means being provided to pivotally support the segments in the bearing housing, the flexible joining and pivotal support of the segments serving to eliminate excessive inequality of loading as between thrust pads.

2. A thrust bearing as claimed in claim 1, comprising a lubricating oil supply passage and a lubricating oil discharge passage, in which the spacer pads include diagonal deflector means to separate oil passing from the supply passage to the pads from oil passing from the preceding pad to the discharge passage.

3. A thrust bearing as claimed in claim 2, in which the deflectors are each in the form of a single diagonal ridge.

4. A thrust bearing as claimed in claim 2, in which the deflectors are each in the form of a plateau having a plurality of grooves formed on the upper face thereof.

5. A thrust bearing as claimed in claim 2, in which the deflectors are each in the form of a plurality of ribs formed on the spacer pad, the ribs forming oil flow channels therebetween, some of the channels being adapted to direct oil to the entry edge of the succeeding thrust pad, and some being adapted to lead oil from the oil exit edge of the preceding pad.

6. A thrust bearing as claimed in claim 2, comprising a fixed sleeve mounted in the bearing housing so as to be coaxial with the shaft and defining the radially inner boundary of the oil supply passage to prevent oil being agitated by contact with the shaft.

7. A thrust bearing as claimed in claim 1, comprising an annular lubricating oil supply passage, a lubricating oil discharge passage radially outwardly spaced from the supply passage and a fixed sleeve mounted in the bearing housing so as to be coaxial with the shaft and defining the radially inner boundary of the oil supply passage to prevent oil being agitated by contact with the shaft.

8. A thrust bearing as claimed in claim 1, in which the thrust pads are formed integrally with their supporting segments of the equalising ring.

9. A thrust bearing as claimed in claim 1, in which the flexibility between the segments is provided by deep slots having a substantial radial component of direction.

10. A thrust bearing as claimed in claim 9, in which the slots are skewed to the radial direction to provide a measure of cross tilt.

11. A thrust bearing as claimed in claim 1, in which the pivot means is provided to support each said intervening segment along a bisecting radius.

12. A thrust bearing as claimed in claim 11, in which each pivot means is in the form of a radial ridge formed integrally with the segment.

13. A thrust bearing as claimed in claim 11, in which the thrust pads are formed integrally with their supporting segments of the equalising ring.

14. A thrust bearing as claimed in claim 1, in which the equalising ring is formed in two circumferentially abutting parts, the abutting portions of the two ring parts being stepped and provided with a slight barrelling about the pivot axis of the adjacent pivoted segment to give a rolling engagement between the parts.

15. A thrust bearing as claimed in claim 14, comprising dowel means for loosely supporting the thrust pads adjacent junctions between equalising ring parts during assembly of the bearing.

16. A thrust bearing for supporting a shaft having a thrust collar rigidly mounted thereon, comprising a bearing housing, two sets of thrust pads, one set being arranged to co-operate with each side of the thrust collar and an equalising ring for each set of thrust pads interposed between the thrust pads and the bearing housing, each said equalising ring being divided into segments, each second segment supporting a thrust pad and the intervening segments each supporting a spacer pad, the segments being flexibly joined to adjacent segments, pivot means being provided to support at least some of the segments in the bearing housing, the flexible joining and pivotal support of the segments serving to eliminate excessive inequality of loading as between thrust pads.

17. A thrust bearing as claimed in claim 16, comprising separate lubricating oil circulation systems for each set of thrust pads, and a circumferential baffle fixed in the bearing housing so as to be adjacent the outer periphery of the thrust collar to prevent cross circulation of the oil between the separate systems.

18. A thrust bearing for supporting a shaft having a thrust collar rigidly mounted thereon, comprising a bearing housing, a set of thrust pads arranged to support said thrust collar, and an equalising ring supporting said thrust pads and interposed between the said thrust pads and the bearing housing, the said equalising ring being divided into segments which are flexibly joined to adjacent segments, pivot means being provided to support every second segment on the bearing housing for pivotal movement about an axis, thrust pads being associated with the intervening segments, the flexible joining between adjacent segments being provided by deep axial slots formed in a diameter parallel with the pivot axis of the pivoted segment adjacent the junction.

References Cited by the Examiner

UNITED STATES PATENTS

| | | | |
|---|---|---|---|
| 1,664,878 | 4/1928 | Fintermann | 308–160 |
| 1,666,521 | 4/1928 | Allen | 308–160 |
| 1,728,268 | 9/1929 | Flanders | 184—60 |
| 1,739,362 | 12/1929 | Kingsbury | 308—160 |
| 1,762,360 | 6/1930 | Schmidt | 308—160 |

FOREIGN PATENTS 97,566    7/1924    Austria.

DAVID J. WILLIAMOWSKY, *Primary Examiner.*

FRANK SUSKO, *Examiner.*